United States Patent
Gargeya et al.

(10) Patent No.: US 6,714,643 B1
(45) Date of Patent: Mar. 30, 2004

(54) SYSTEM AND METHOD FOR IMPLEMENTING WAIT TIME ESTIMATION IN AUTOMATIC CALL DISTRIBUTION QUEUES

(75) Inventors: Padma R. Gargeya, Sunnyvale, CA (US); Charles M. White, San Jose, CA (US); Stuart Dufour, Cupertino, CA (US)

(73) Assignee: Siemens Information & Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/512,988

(22) Filed: Feb. 24, 2000

(51) Int. Cl.[7] ............................................. H04M 3/00
(52) U.S. Cl. ............... 379/266.06; 379/72; 379/265.02; 379/265.1; 379/266.01; 379/266.03
(58) Field of Search ..................... 379/67.1, 72, 214.01, 379/265.02, 265.03, 265.07, 265.08, 266.01, 266.03, 266.06, 309

(56) References Cited

U.S. PATENT DOCUMENTS

| | | | |
|---|---|---|---|
| 4,788,715 A | | 11/1988 | Lee |
| 5,006,983 A | * | 4/1991 | Wayne et al. .................. 705/8 |
| 5,506,898 A | | 4/1996 | Costantini ................... 379/266 |
| 5,754,639 A | * | 5/1998 | Klockhart et al. ..... 379/266.05 |
| 5,867,572 A | | 2/1999 | McDonald ................... 379/266 |
| 6,023,681 A | * | 2/2000 | Whitt ............................. 705/8 |
| 6,064,731 A | * | 5/2000 | Flockhart et al. ...... 379/265.06 |
| 6,157,655 A | * | 12/2000 | Shtivelman ................. 370/412 |
| 6,463,346 B1 | * | 10/2002 | Flockhart et al. ........... 700/102 |

* cited by examiner

Primary Examiner—Bing Bui (57) ABSTRACT

A system and method for predicting the wait time of a caller to a call center is disclosed. The call center associates a set of agents to which the caller may be queued. This set of agents selected may depend on the skills that each agent possesses, the type of service request made by the caller, caller priority, time of day, day of week and other conditions. An initial wait time estimate may then be given to the caller who is just queued. As a caller's conditions may dynamically change, a caller's position in the queue may also change as well as the pool of available agents. Periodic wait time estimate updates may also be given to the queued caller. A caller's wait time may be estimated based upon mean inter-arrival times for recently past calls into the call center. An average inter-arrival time may be calculated for the last several calls. Alternatively, a caller's wait time may be estimated based upon calls that are recently queued and dequeued. A table of values, $W_{nj}$, are maintained wherein each such value denoting the jth recent wait time of calls arriving with n calls already in the queue. An average value, $W_n$, for each n among all such $W_{nj}$, is thus calculated and a caller's estimated wait time is thus given, depending on how many calls are in the queue at the time of calling.

21 Claims, 3 Drawing Sheets

SYSTEM AND METHOD FOR IMPLEMENTING WAIT TIME ESTIMATION IN AUTOMATIC CALL DISTRIBUTION QUEUES

BACKGROUND OF THE INVENTION

Automatic Call Distribution (ACD) systems queue calls—typically from customers—and connect them to agents that are trained to handle the general type of inquiry generated by such customer calls. As a minimum courtesy, it is known in the art to inform callers waiting in a queue of an estimated wait time before service. In U.S. Pat. No. 4,788,715, Lee discloses a system in which calls are entered into a single queue of similar attendants and an estimated wait time is provided for each caller entering the queue. As the attendants are similar (i.e. all attendants are trained to handle the same type of call inquires), the estimated wait time is simply based on the number of customers in queue times a factor ("ESTQ", which is a metric of average sampled service times) divided by the number of available similar servers—to provide a lower bound estimate of wait. This estimate may be altered by another factor ("ESTS", which is a metric of average sampled service times for customers actually served) to provide an upper bound estimate of wait.

Another known method for wait time estimation, used when appropriate values of call processing time and agents were difficult to obtain, estimates wait time as the average time spent in queue so far by the calls already in a queue.

Today's service queues are not so simple, however. Advanced call queuing techniques allow for the possibility of call routing involving priorities, or calls overflowing to secondary groups of agents. These features, however, can cause systematic inaccuracies in these prior methods of estimating wait times. For example, a call queuing for a group of 5 agents with average call processing time of 10 minutes will be given an expected wait time of 60 minutes if there are 30 calls ahead of it in queue. If, however, the routing algorithm queues the call to a secondary group of 10 additional agents after the call has waited 2 minutes, it is likely the call will be served well before an hour has elapsed. Additionally, the term "caller" is a much broader concept today. For example, today's caller is anyone trying to contact a call center to obtain service or assistance. Any means of communication are possible to facilitate such call—telephone (analog or digital), email, voice-over-IP, and the like.

Moreover, increasingly in client-server environment, the switching unit and the wait time processing/playback applications are different entities and not necessarily included in a single, homogenous box Thus, there is a need to quickly and accurately provide current callers with a realistic estimate of their particular wait time, based on their particular service request—and based on the increasingly diverse sets of operating environments for call center.

SUMMARY OF THE INVENTION

The present invention provides a system and methods for more accurately predicting the wait time of a caller querying a request from a call center. The call center of the present invention comprises a switching server, a recording/playback server, and an agent server. Callers communicate with the call center with whatever media is available—e.g. telephones, computers, emails, web buttons, and the like—and request service from available agents. If there is no available agent to handle the request, call is queued by the call center until an agent becomes available.

The present invention associates a set of agents to which the caller may be queued. This set of agents selected may depend on the skills that each agent possesses, the type of service request made by the caller, caller priority, time of day, day of week and other conditions. An initial wait time estimate may then be given to the caller who is just queued. As a caller's conditions may dynamically change, a caller's position in the queue may also change as well as the pool of available agents. Periodic wait time estimate updates may also be given to the queued caller.

In another aspect of the present invention, a caller's wait time may be estimated based upon mean inter-arrival times for recently past calls into the call center. An average (i.e. average, mean, or mode or other statistical measure) inter-arrival time may be calculated for the last several calls. The caller's estimated wait time then may be calculated as a function of this calculated inter-arrival time and the number of calls on the queue.

In another aspect of the present invention, a caller's wait time may be estimated based upon calls that are recently queued and dequeued. A table of values, $W_{nj}$, are maintained wherein each such value denoting the jth recent wait time of calls arriving with n calls already in the queue. An average value, $W_n$, for each n among all such $W_{nj}$, is thus calculated and a caller's estimated wait time is thus given, depending on how many calls are in the queue at the time of calling.

One advantage of the present invention is flexibility. With the present invention, a call center administrator does not have to supply values for average call processing time and agents staffed. Additionally, the number of agents eligible to answer the call and the average call processing time can vary dynamically over time, as do caller priorities and call volume, and the present invention will automatically adjust.

These and other advantages will become apparent in reviewing the detailed description of the invention in light of the following drawings.

DETAILED DESCRIPTION OF THE INVENTION

Figure 1:
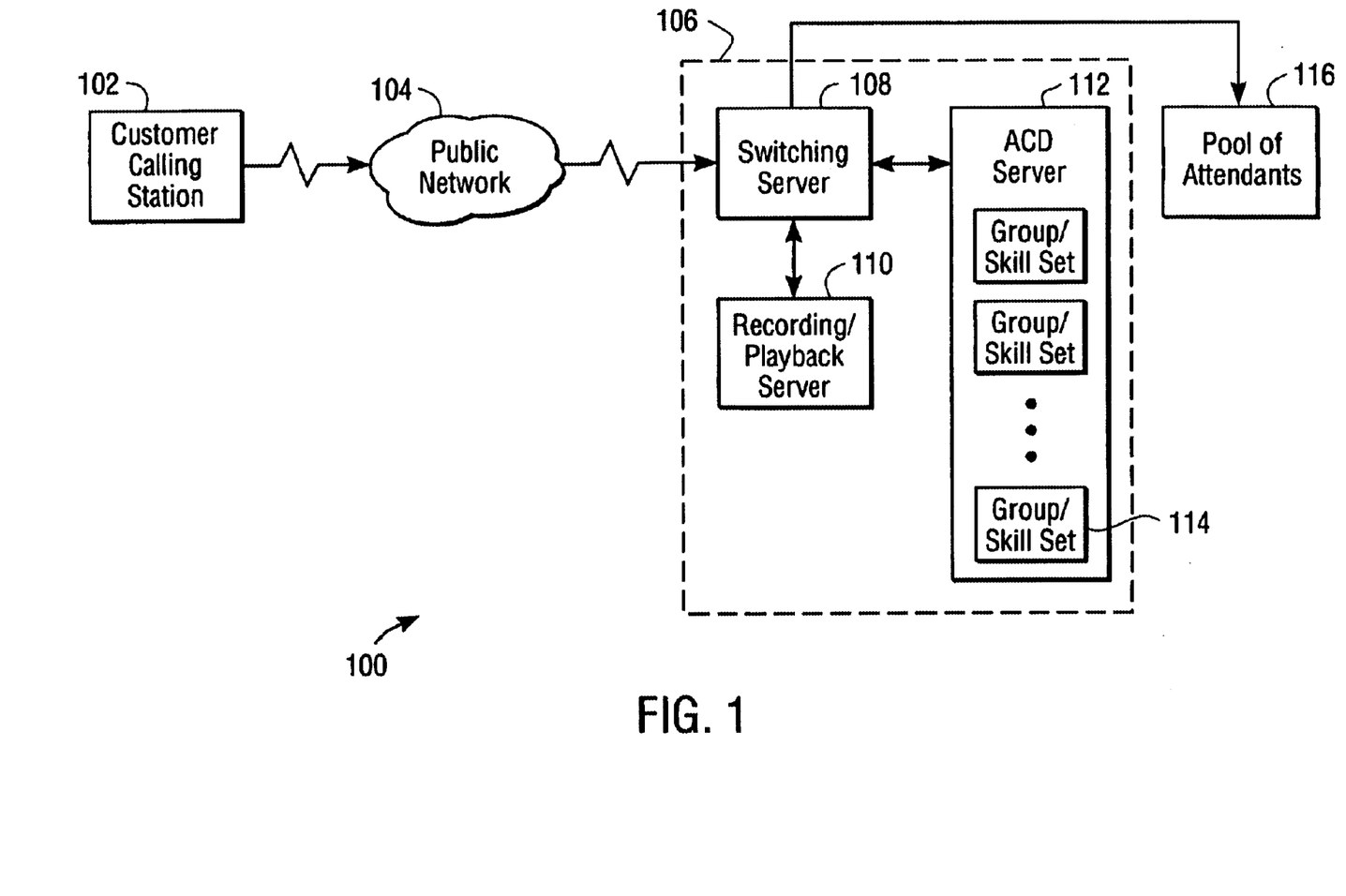
FIG. 1 depicts an embodiment of an ACD center as made in accordance with the principles of the present invention.

Referring to FIG. 1, system 100 depicts the general environment for the present invention wherein call requests being made by customers arrive, given the myriad of today's flexible communications media. Generically, customers may make service request calls at a customer calling station 102. Such stations 102 could be implemented as a telephone, a computer terminal or any other communication means currently available. A service request may then be relayed to ACD center 106 via a public network 104. The implementation of the network 104 is to be broadly construed. For example, network 104 may be the public switched telephone network (e.g. POTS), or it may be implemented as a network (public, private or the like) that may be connected to, or may itself be, the internet (e.g. World Wide Web) to transmit such calls and requests. The only requirement for network 104 is that it be able to transmit customer service requests—in either digital or analog format—in any method of communication available (e.g. analog telephone calls, digital telephony, voice-over-IP, email, web 'contact me' buttons, and the like).

ACD center 106 accepts customer requests from network 104 in whatever format available. ACD center 106 comprises a switching server 108 that accepts the calls from customers. Switching servers are well known in the art and might preferentially be implemented as a PBX switching server. Playback/recording server 110 is coupled to switching server 108 that provides playback for wait time announcement for waiting customers and/or recording service for those customers who no longer desire to queue for service but would like to leave a service message. Additionally, recording/playback server 110 may be programmed to glean additional information from the caller via IVR or phonemail or the like. IVR, as used for the purposes of the present invention, is an example of a playback server and will be used interchangeably.

ACD server 112 is also coupled to switching server 108. ACD server 112 (or "agent" server) generally maintains an association of agents/attendants and callers. In one embodiment, ACD server 112 additionally maintains an association of agents and the particular skills that they have. This association of agents and skills allows for calls and callers to be associated with several sets of possible agents who have the appropriate skills to handle the caller's request. In one embodiment, a caller could be associated with a primary group of agents and zero or more secondary groups of agents. Secondary agents (or overflow agents) may be represented by agents who are not the most optimal agents to handle the request; but may be "good enough".

It will be appreciated that call center 106 could be implemented in a piece-wise fashion whereby switching server 108, recording/playback server 110 and ACD server 112 are implemented in different locations and communicate and process via a host of well known remote protocols. Additionally, it is understood that the functionality of several of these components could be implemented in one piece of instrumentation. For example, ACD server could be implemented with the switching server, and possible together with the playback server. The proper scope of the present invention contemplates that the general functionality of these components be implemented in whatever fashion that is known in the art.

Along with information including the calling number, called number, and possibly some input collected from the caller by recording/playback server 110, a call is queued in center 106 and assigned a group/skill set 114 from ACD server 112. Once the waiting for a caller has expired, the caller is then given over to an attendant/agent 116 from a pool of such attendant/agents for processing and handling of the inquiry. Agents are categorized by their membership in a group or on the basis of the skills they possess to the types of calls entering the call center.

Figure 2:
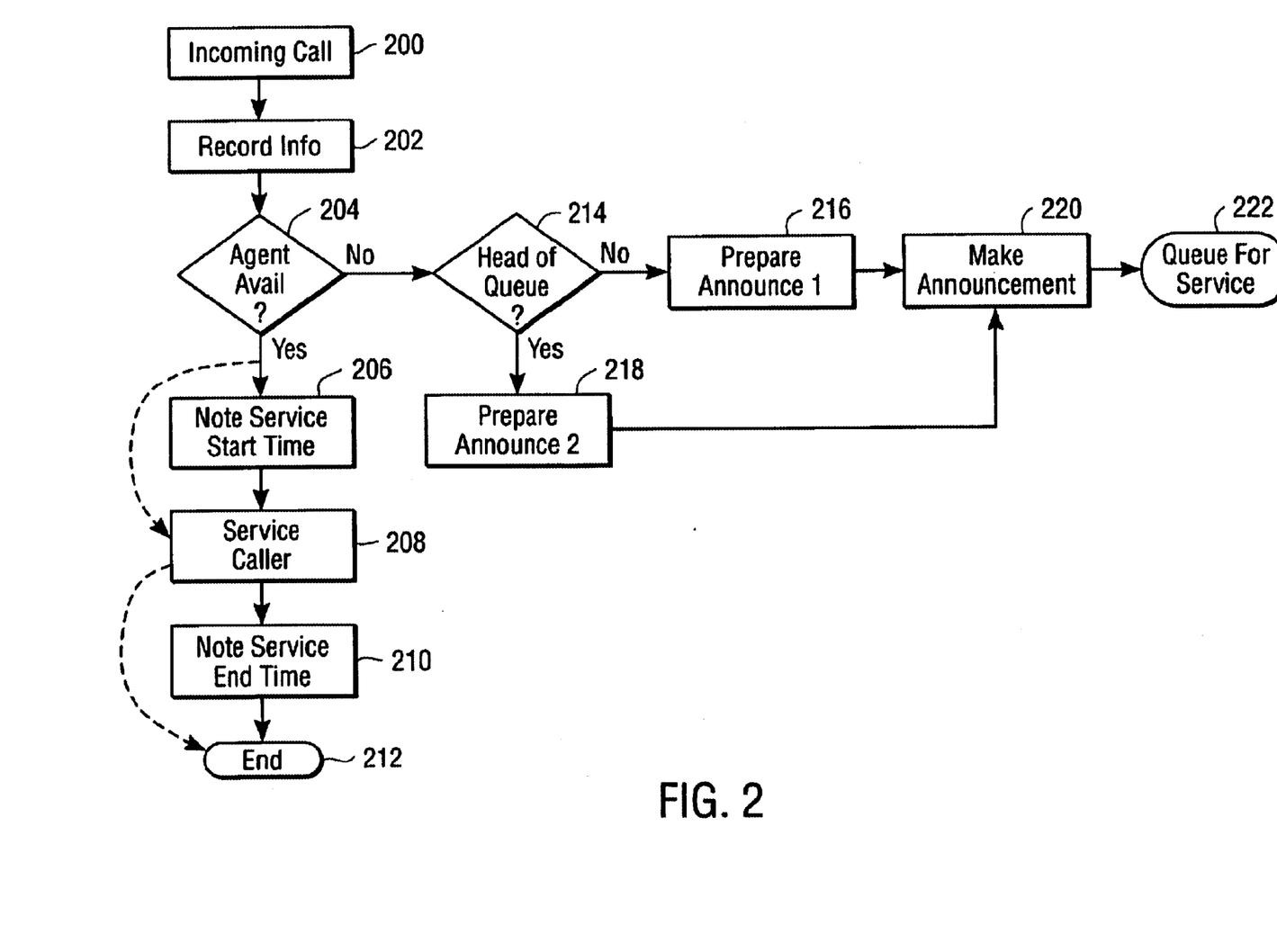
FIG. 2 is a flowchart of the basic operation of the ACD center.

FIG. 2 gives a flowchart of the basic operation of ACD center 106. When incoming call 200 first enters ACD center 106, some information is initially recorded about the incoming call and, possibly, the call request at step 202. Such information might include the time of the call, the phone number of the originating caller, the phone number of the destination respondent, type of caller service inquiry, and the like. Such information might help determine whether a suitable agent is available, which queue to be placed in, the place such call might occupy within a queue and the expected wait time for the caller.

Based possibly upon such information recorded at 202, center 106 determines whether a suitable agent is available immediately to service the caller at step 204. If there is an agent, center 206, at its option, may note the start time of the service at 206, hand over call to agent for service at step 208, and optionally note the end time of the service at step 210. If no suitable agent is immediately available, then center at step 214 determines whether caller is at the head of a queue. If so, center at step 218 prepares a suitable announcement informing the caller about the status at 220. Otherwise, center at step 216 prepares another announcement giving the caller a wait time estimation—as discussed further below. Center at step 220 then makes whichever announcement is appropriate for that caller and queues the caller for service at step 222. It will be appreciated that many possible variations on this basic flowchart are possible without departing from the scope of the present invention. For example, the center may make and prepare other announcements based on other factors—e.g. whether the caller is a priority caller; whether caller may leave a message instead of queuing; whether the "call" is an email, requiring an email autoresponse with a wait time estimate; whether the call is a callback request or a web 'call me' request; and the like.

Figure 3:
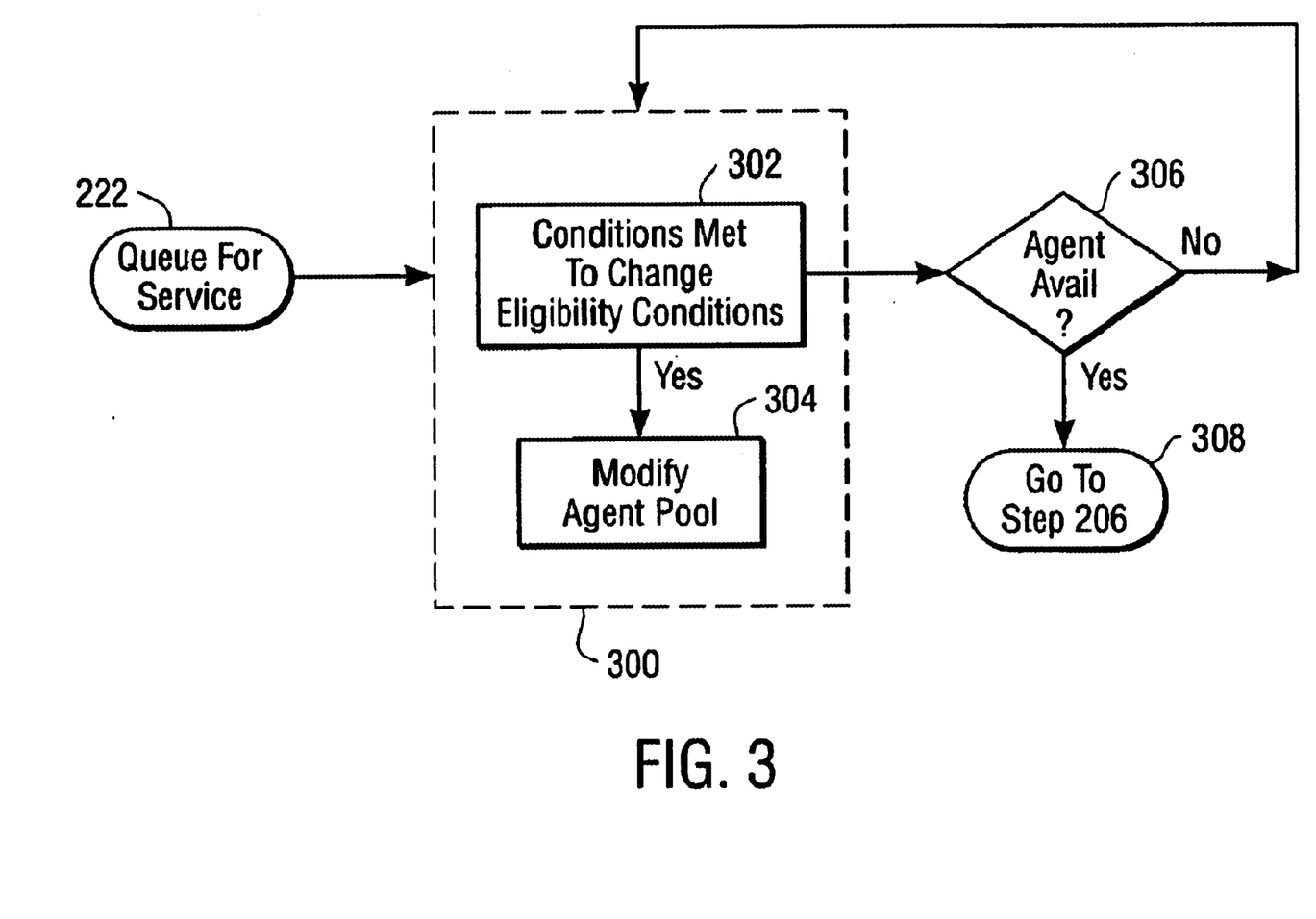
FIG. 3 is a flowchart depicting the virtual loop of queuing for service for callers.

FIG. 3 is a flowchart depicting the flow for a caller queue for service. As callers are queued for service at step 222, they enter a queue monitoring task 300 that continually checks conditions at 302 that might alter the eligibility conditions for any given caller; and, hence, the relative position on a queue. For example, a change in a caller's eligibility might alter the appropriate pool of agents at 304 available to handle the caller's request. This process is preferably implemented as a virtual loop in which conditions and agent pools may be dynamically adjusted for optimal service processing.

As conditions are constantly being evaluated and adjusted, the system tests as to whether a suitable agent has become available at step 306. If so, then the caller is transferred to an agent—e.g. taken to step 206—for processing. Otherwise, the caller remains in the queue and conditions are dynamically tested and adjusted. As will be discussed further, some conditions that are evaluated might include: time spent in queue; caller priority (which may change with time already waiting in queue); number of qualified agents (so that the pool could change from the "perfect" team to answer the call to "very good" candidates); agent skills and areas of specialization; time of day and day of week.

ONE PARTICULAR EMBODIMENT

Having discussed the present invention—together with its operating environment—in its broadest outline, one specific embodiment of the present invention will now be discussed. It will be appreciated that the scope of the present invention should not be limited by the disclosure of this particular embodiment; but that the scope of the present invention contemplates the broader scope as given in its entirety herein.

Abbreviations/Terminology

Here are some of the abbreviations used in this embodiment:

ACD: Automatic Call Distribution. A method by which calls are distributed to agents waiting to answer calls.

ART: ACD Routing Table. A set of programmable steps that determine the flow of a call through a call center.

BQA: Basic Queue Announcement. An announcement given by an IVR to a caller waiting in an ACD queue.

EWT: Estimated Wait Time. An estimate of how long a caller would have to wait before being answered by a live agent.

ORTL: Open Real Time Link. A Siemens protocol/application link which provides realtime events of call center activity to customer-provided third party vendor applications. It enables third party vendors to develop realtime and historical call center applications. Of course, any link providing real time events from a switching server, such as CTI, CSTA TSAPI, CALL PATH, would suffice for the purposes of the present invention and such terms and links will be used interchangeably with the term ORTL Overflow Groups and Secondary Groups are used interchangeably throughout the following description.

General Comments

It is to be appreciated that the EWT is an estimate and by its very nature will not be consistently accurate. There will always be scenarios where the time given will not be correct. This would be the case with any predictive queue wait algorithm for a system as complex as ACD routing where there are many important parameters that constantly change: number of ACD agents available to take calls, number of ACD Groups and agents per group, active ARTs, caller priorities, "arrival rates" (call traffic), queue lengths, and most importantly service times (the call length). Some scenarios that might cause discrepancies would be when there are very few agents taking calls with a large number of calls in queue (here the length of every call will make a difference to the accuracy of the queue wait time to the caller who just joined the queue). Another would be around shift changes when ARTs and the number of agents taking calls change rather abruptly.

Given the large number of parameters and constant change that could potentially affect wait time calculations, in order to provide a satisfactory BQA solution that fits various types of call centers, one might need to do the following:

- Have multiple ways of calculating wait times (multiple algorithms), each of which uses one or more parameters that affect the call wait times. This way one can define circumstances under which the algorithm will perform well and also explain the circumstances when it will not. In addition, some call centers might want other queue wait announcements like number of calls in queue, or age of oldest call in queue or just an average wait time (something based on service levels).
- For each EWT algorithm, make as many parameters as possible configurable. A default set of parameters may be provided that may work for an average call center supervisor, but the system can also give the supervisor the option of tweaking the parameters to suit their Call Center. One good example of this is the sample size. It can determine an average sample size of say, 25 calls, but in call centers with very low call volumes this may be too big a sample size.
- Possibly use data to make multiple 'queue progress' announcements to callers over time.

Factors Affecting Wait Times

In the ACD Routing environment there are various factors that can affect the flow of the call. As a result, wait times are governed by multiple factors:

1. Call length
2. Number of agents taking calls
3. Number of groups the call is queued to
4. Arrival rates (traffic) and call's position in queue at the time of arrival
5. Active ART (ART design)
6. Service time (call length and post-call processing time)
7. Call Priority The ability to predict estimated wait times depends on how many of the above factors are taken into account. Usually, the more factors accounted for, the better. However, more factors also increase the complexity of the algorithm calculating the EWT.

In an ACD environment, ART steps (call flow design) is a factor that gets constantly altered by the Call Center supervisors. This affects the call in terms of how many groups it gets queued to, under what conditions (like agent availability in other groups, age of oldest call in this or other groups etc), and what the caller does while waiting (listen to music, a recording, interact with an IVR etc). Given all this, one can factor in call flow (ART design) into wait time predictions either by knowing when the call enters and leaves an ART (not just one group). Alternatively, it can be accomplished by giving call center supervisors the ability to modify the list of groups that are involved in a call's flow through an ART.

One possible design alternative occurs with the choice of "when" the wait time announcement is made to the caller. If a call passes through multiple ARTs and it finally reaches the ART where it will be answered by one of the groups there, it is at this "destination ART" that the wait time announcement may be made. This design alternative may be advantageous because the calculations are based on primary and secondary groups, the answer times etc, and all that is valid in the ART where the caller is actually going to get answered.

Additionally, an advantageous design for providing Wait announcements might consider the following elements:

- Provide a few "calculated" estimates of wait times and determine under what conditions each of these works well and where it fails.
- Make (as much as is possible) parameters of calculated wait times configurable wherever applicable (for example, if data is polled and stored, or calculated on a per call basis, which method of calculation to use etc).
- Provide the ability to announce some "raw data" from the ORTL stream. This includes things like number of calls in queue, age of the oldest call in queue, etc. which will always be correct. This will not add any overhead besides a query of the link per call, because no "calculations" are done, and this data may not need to be stored in the IVR.

Given that a good approach to providing Wait Time announcements might include raw data, the following comprises the kind of information that may be useful:

- Service Level data: Of the last x number of calls, how "y" percent of calls get answered within "z" minutes or less. "x" (size of the data) and "z" (threshold time value) are usually configured in the ACD server. This can be announced to the caller as "our goal is to answer all calls within 'z' minutes" or words to that effect. Additionally, it might be desirable that the wait time application checks that the "y" percent is not very low, (say, less than 80% or 90%), otherwise this estimate may not accurately reflect the caller's average wait time.
- Number of calls in queue.
- Age of the oldest call in queue (how long has the longest wait been in the current queue).

All this information should be available through the Service Level query via ORTL. The last two pieces of information can be gotten via an APRI query from the IVR application as well; thus not needing ORTL.

By providing multiple choices for Wait Time announcements, there is an opportunity to give "continuous" wait announcements. For example, a caller in queue received a wait time estimate of 10 minutes. After 5 minutes it might be desirable to send the caller back into the IVR and announce the "remaining" wait time.

Another design alternative is to provide continuous information to the caller, but using different metrics each time. So for example, the first time around, a caller could hear the wait time and the second time, the average service level of the group.

Yet another design alternative is to provide for tighter integration between the switch and the wait time. This can be leveraged for Wait Time announcements since the caller's actual position in primary queue, best position out of all queues the call is in, and similar information can then be obtained. For example, this might be possible via D channel signaling (due to a CorNet-N connection) between the switch and the IVR. The following pieces of information about a call are available through this mechanism:

Number of calls in queue,

Age of the oldest call in a given queue,

Caller's position in their "primary queue",

Best position of all queues that the call is in,

Number of Idle agents in a group,

Number of logged on agents in a group.

One important benefit of this information is that if the ORTL link is down for whatever reason, a CorNet connected IVR can still offer some information to the caller. Also, the IVR application could know the exact position of the caller in queue and provide continuous announcements.

METHODS FOR ESTIMATING WAIT TIMES

Having now discussed the system of the present invention, its environment in which it operates, and some of the relevant factors effecting wait time, novel methods of wait time estimation will now be discussed.

1. Queue Age Sum Method

This method takes into account two factors: the queue length, and wait times associated with each call in the queue. The wait time may be rounded up in minutes.

(QueueAgeListSum/60)/CallsInQueue where:

QueueAgeList (array) A list of times in seconds associating each call in the queue (how long each call has been in the queue).

CallsInQueue (number) The number of Calls queued to that ACD group.

QueueAgeListSum is in seconds and this is the sum of the age of all calls.

One advantage of this method is its simplicity. There is no need to provide information on number of agents answering calls or average talk time and work time per call because this would be reflected in the wait times for calls currently queued. It might also work well for call centers that have reasonably high call volume evenly distributed, and a relatively steady number of agents taking calls, spending approximately similar amounts of time on each call.

2. Agent Process Time Method

The following method might be provided as a default method selected for the call center if they don't specify any special requirements. In this method, the "talk time" for calls as well as the number of agents available to take calls may be calculated as well as estimated.

(CallsInQueue*AverageProcessTime)/(EligibleAgents)

where

CallsInQueue (number): The current number of calls in specified ACD queue

AverageProcessTime (number input by User via configuration): This is a user-configurable value. The value may be given as an integer and represents "talk time" of an agent in a call (in minutes).

Analysis of Queue Age Sum and Agent Process Time Methods

Very general empirical studies showed that the two formulae that have been used to estimate a caller's upcoming wait time tended to estimate too high when the wait time is short (less than one minute) and too short when the wait time is long (more than 10 minutes).

In ACD, a call gets queued to a primary group (the "best" group to answer the call) and then subsequently, based on conditional routing steps (how long call has waited, if agents are available in other groups), queue the calls simultaneously to other overflow groups. Any one of these groups might end up taking this call, not just the primary group. So the wait time spoken for the primary group will be inaccurate for the caller who gets answered by a secondary group. This can be partially alleviated by configuring, for each primary group, a set of up to 5 secondary groups. It should be appreciated that any such solution may not fully alleviate the problem.

These enhancements are applicable to all methods since it addresses basic flaws.

Just as ACD allows configuration of "shift sets" (times of day when certain ARTs will be active), at a high level, a configuration parameter should determine up to 4 different (non-overlapping) time spans when a calculation method can be chosen, and the calculations are reset. This allows for the usage of a method based on traffic levels and other special Call Center changes (like fewer agents in a shift).

To fix the problem of overflow groups not being taken into account, allow the user to configure, for each primary group, a set of up to 5 secondary groups, each group having a field for a time value. The time field for the secondary group represents the wait time after which, the EWT should be the best time between the EWT of primary group and the secondary group. In other words, this comes into play when the EWT exceeds the configured time. So a typical record might look something like this:

Primary Group

Secondary Group 1, Time Value

Secondary Group 2, Time Value

Secondary Group 3, Time Value

For example, suppose we have Q1, Q2 <2 mins>, Q3 <4 mins>, Q4 <5 minutes> for the values above.

If the EWT of Q1 is between 2 and 4 minutes, the best time between groups Q1, and Q2 would be taken. If EWT is between 4 and 5 minutes, the best time between Q1, Q2, Q3 would be taken. If it is greater than 5 minutes, wait times for all 4 would be taken into consideration for the best time. If all the time value fields are set to 0, it might be useful if all groups in the list are averaged right from the beginning.

It should be noted that the time value field may take into account conditional routing that is often used to queue a call to an overflow group—typically, as the call waits longer, ARTs are designed to queue the calls to more groups in an effort to get the call answered.

Time: Time needs to be stored in MM:SS level granularity and should not be rounded off to the nearest minute.

Borderline conditions (no prior calls in queue, no agents logged on). In these cases escape messages of a non-quantitative nature, or a statement about the number of calls ahead in queue may be a better option. The following are a few suggestions in this regard:

When there are no prior calls in queue and the caller needs an EWT announcement, if there are logged on agents, speak a message that "you are at the head of the queue and will be answered when an agent becomes available".

When Agent Process Time Method is being used, when there are no logged on agents and a caller needs an EWT, if possible, either tell the caller their queue position or use another method to do a calculation.

Zero denominators or numerators should be appropriately handled (like no calls in queue, or first call's wait time when there are zero calls in queue, no agents in the states defined as "available to take calls" or after hours, when there are no agents. When insufficient data is available, it may be preferable to do an ORTL on-demand Service Level query to get an estimate of the wait time or get the caller's position in queue or some other relevant factor.

If the rate of calls entering the ACD Queue was steady, the system could get a good estimate for this value by using the on-demand mechanism to get queue status. This would be the difference in time waited between successive calls in the queue (i.e., an average of this difference between all calls queued). For example, if 3 calls are queued for 2, 5 and 6 minutes, it could be assumed the average interarrival time is $((5-2)+(6-5))/2=2$ minutes.

3: Mean Inter-arrival Time (MIT) Method

The following steps comprise the MIT method:

1. Calculate the average inter-arrival time for the last M calls (calls may be queued or not) arriving at the call center $$MIT=[(t_M-t_{M-1})+(t_M-t_{M-2})+\ldots+(t_2-t_1)]/(M-1)$$

where $t_j$ denotes the arrival time of the jth oldest call ($t_M > t_{M-1}$, $t_{M-1} > t_{M-2}$, etc.)

The number of calls M whose inter-arrival times are averaged is a parameter configurable by the call center administrator. A value of 25 is suitable in most cases.

2. Calculate Estimated Wait Time (EWT) as $$EWT=N*MIT$$

where N is the number of calls on queue (including the call for which this wait time is announced).

It will be appreciated that the MIT method may be accomplished with calls that are either queued, not queued or both. Additionally, while a sample of the last 25 calls is suitable for most applications, it will also be appreciated that any number of calls also suffices for the purposes of the present invention. MIT gives a metric, generally speaking, of how busy the call center is—i.e. a small MIT implies that the call center is fairly busy (large number of calls incoming and/or calls getting processed fast by agents) and a large MIT implies that the call center is less busy (fewer calls incoming and/or agents spend more time with calls).

4: Queue-DeQueue (QDQ) Method

For each queued call the actual wait time is calculated by subtracting the time when the call was queued from the time when the call was removed from queue to connect to an agent. Let $W_{nj}$ denote the $j^{th}$ most recent measured wait time of all calls arriving with exactly n calls already in queue. A table such as the following is kept in memory:

| Number of Calls in Queue | K Most Recent Wait Times |
| --- | --- |
| 0 | $W_{0K}, W_{0(K-1)} \ldots W_{01}$ |
| 1 | $W_{1K}, W_{1(K-1)} \ldots W_{11}$ |
| 2 | $W_{2K}, W_{2(K-1)} \ldots W_{21}$ |
| ... | ... |
| n | $W_{nK}, W_{n(K-1)} \ldots W_{n1}$ |

Let $W_n$ denote some typical value (e.g. median or average) representative of the $W_{nj}$ for j=1 to some number K. (For example, $W_3$ could be the median of the previous 20 calls arriving when there were 3 calls already on queue.) If, when the next call is queued, there are k calls already on queue, the value $W_k$ is announced as the estimated wait time for that caller.

It will be appreciated that obvious variations on the QDQ method are contemplated by the present invention. For example, each $W_n$ may be estimated by a count of wait times other than a strict K most recent wait times—i.e. some other sampling of wait times with n calls in the queue is possible and within the scope of the present invention. Likewise, some other algorithm for $W_n$ other than a median or average value would also suffice for the purposes of the present invention. It suffices that $W_n$ have some rational relationship of wait time based on the number of callers already formed in the queue.

One of the main disadvantages that QDQ seeks to address in some EVVT methods is the inability to "see" what goes on inside an ART. A call queues to one Group and then to subsequent groups based on various conditions being met. However, a call that is queued to a primary group is dequeued only when one of the following conditions is met (this is given in the "dequeue reason" field of the event):

The call is answered by the primary group

The call is answered by any other overflow group within the ART

The call is routed to a different ART either via route steps or due to shift changes.

The caller abandoned

Given these circumstances, it might be useful to monitor the ORTL link o get queue-dequeue information regarding all calls to primary groups and maintain the last "X" number of calls queued to a particular group. In essence, his method gives an "ART based" calculation instead of a "group based" one because the call's time in queue is tracked until its either answered, abandoned or leaves the ART for some reason.

A monitoring service request for each of the groups monitored would provide ORTL events whenever calls are queued and dequeued to that group and store the last "X" number of calls (with entry time stamps) and also an average/best time. The call's position in queue in a regular non-APRI flex routing environment may not be known at the time that its wait time is queried (for speaking by the IVR). So an assumption could be made that it is the last call in queue.

When a call comes in, its position in the primary queue as well as the enqueue time stamp may be stored. When it dequeues, the wait time for the primary queue may be calculated and stored. It should be noted that the average may be a rolling average based on the last 10 (or 25 or 50) calls. Additionally, it should be noted that dequeue messages might also be received from the secondary group(s) the call had queued to.

The data storage per group could be implemented in the form of a 2 dimensional array, the X axis showing the number of calls stored (10 or 25 or 50 or whatever) and the Y axis showing the position of the call in queue when it first entered the queue. The rightmost column might store the average of all the wait times in that row. One possible format is as shown:

|  | Call 1 | Call 2 | Call 3 | Call 4 | Call 5 | Call 6 | Call 7 | Call 8 | Row Average (or per config) |
|---|---|---|---|---|---|---|---|---|---|
| $1^{st}$ in Q | 3:45 min | 2:15 min | 3:00 min | 4:00 min | ... | ... | ... | ... | 3:15 mins |
| $2^{nd}$ in Q | 4:15 min | ... | ... |  |  |  |  |  | ... |
| $3^{rd}$ in Q | 5 min | ... | ... |  |  |  |  |  | ... |
| $4^{th}$ in Q | 5:30 min | ... | ... |  |  |  |  |  | ... |
| $5^{th}$ in Q | 7 min | ... |  |  |  |  |  |  | ... |
| $6^{th}$ in Q | 9 min | ... |  |  |  |  |  |  | ... |
| $7^{th}$ in Q | 10 min | ... |  |  |  |  |  |  | ... |
| $8^{th}$ in Q | 11:30 min | ... |  |  |  |  |  |  | ... |
| $9^{th}$ in Q | 13:31 min | ... |  |  |  |  |  |  | ... |

Thus, for example, if a call comes in and it is the second call in primary group A, the wait time announced for that call should be the rightmost column value (average wait time) for the "$2^{nd}$ in Q" row. Once this call is answered, the actual time it waited would be input in this table. If a call's position in queue (when it comes in) is greater than the last queue position stored, then it should be possible to extrapolate the wait time for this call based on the last recorded queue length's average wait time.

When a call's wait time is to be announced, an on-demand ORTL request might be made to get the length of the queue (it would be assumed that this is the last call in queue). The "average wait time" on the rightmost column should be a default, but per call center configuration preferences this could be a median, mode or best time or the like. Also, a log file might be implemented to capture actual wait times of calls to various primary groups. This might help in the debugging process.

The interface to the "application level" is the same as for the current methods.

Sample Size: The Sample size (how many calls are averaged etc) needs to be configurable. An option of up to 50 calls could count in the sample size. The default sample size should be set at 25.

Calculation Method: Add a configurable parameter for any specific preferences of whether an EWT calculations should be a mean, median or mode. The default value should be the mean.

Initial values: Let the user define what initial values to use. The starting point (time value) for EWT calculations should be given two choices: start from 0, or use historical data from same shift 24 hours ago. For the first X number of calls (based on sample sizes) wait time calculation may be inaccurate if EWT data is reset to start from 0. Storing historical data and using it as a starting point (like data from 24 hours ago, or the last time this method was used) is preferable.

In operation, it will be appreciated that the wait time application should be able to accomplish a few things. For example, the application should to be able to login to ORTL (or some other suitable real time data stream) and start and maintain the connection. It should provide an easy interface for configuring the groups to be monitored and application specific parameters. It also should provide the rolling estimated wait times for the individual groups being monitored.

Additionally, it should provide a way for the application to access those values from the IVR so that they can be played to the caller.

This application should work well for calls that begin and end in one ART. In other words, one reason one would dequeue from the primary group is to be answered by a an agent belonging to a group within an ART. It is also not dependent on the number of agents logged on in any one particular group. The sample sizes and distribution of calls is important and assuming that traffic patterns are similar for a particular shift (normal distribution around the mean), this method would be satisfactory for most call centers. This application might be well suited as a default method.

Several novel methods for wait time estimation have now been described that work well in today's flexible call center environment. It will be appreciated that the scope of the present invention contemplates any and all obvious variations on the system and methods herein presented.

What is claimed is:

1. In a call center comprising a switching server, a recording/playback server, and a agent server; wherein callers communicate with said call center with requests to be handled by agents;

a method for implementing a waiting period for callers who may not be immediately serviced by available agents, the steps of said method comprising:

a) associating an initial set of agents to which said caller may be queued said initial set comprising a primary group and one or more secondary groups of agents;

b) delivering a first wait time announcement to said caller regarding an estimated wait time for service, said estimated wait time accounting for said primary group and said one or more secondary groups;

c) monitoring changes in said caller's conditions during said wait period;

d) if conditions in step (c) meet predetermined changes, said set of agents to which said caller may be queued to a second set including said one or more secondary groups;

e) if modification is made in step (d), delivering an additional wait time announcement regarding the estimated wait time for service.

2. The method as recited in claim 1 wherein the step of said delivering said first time announcement further comprises estimating wait time based upon queue age sum method.

3. The method as recited in claim 1 wherein the step of said delivering said first time announcement further comprises estimating wait time based upon agent process time method.

4. The method as recited in claim 1 wherein the step of said delivering said first time announcement further comprises estimating wait time based upon mean inter-arrival time method.

5. The method as recited in claim 1 wherein the step of said delivering said first time announcement further comprises estimating wait time based upon queue-dequeue method.

6. The method as recited in claim 1 wherein the step of said delivering said first time announcement further comprises one of the set of wait time estimation methods; said set comprising queue age sum method, agent process time method, mean inter-arrival time method, and queue-dequeue method.

7. The method as recited in claim 1 wherein said step of monitoring further comprise monitoring said caller's time spent in queue.

8. The method as recited in claim 1 wherein said step of monitoring further comprise monitoring said caller's priority.

9. The method as recited in claim 1 wherein said step of monitoring further comprise monitoring said caller's number of qualified agents.

10. The method as recited in claim 1 wherein said step of monitoring further comprise monitoring said caller's associated agent's skills.

11. The method as recited in claim 1 wherein said step of monitoring further comprise monitoring said caller's time of day.

12. The method as recited in claim 1 wherein said step of monitoring further comprise monitoring said caller's day of week.

13. The method as recited in claim 1 wherein said step of monitoring further comprise monitoring shift changes of said agents.

14. In a call center comprising a switching server, a recording/playback server, and a agent server; wherein callers communicate with said call center with requests to be handled by agents;
   a method for calculation of a wait time estimation for said callers based on mean inter-arrival time, the steps of said method comprising:
      calculate the average inter-arrival time for the last M calls;
      calculate said caller's estimated wait time as the number of calls on the queue times the average inter-arrival time.

15. In a call center comprising a switching server, a recording/playback server, and a agent server; wherein callers communicate with said call center with requests to be handled by agents;
   a method for calculation a wait time estimation for said callers based on queue-dequeue calls, the steps of said method comprising:
      maintain a table of values, $W_{nj}$, each such value denoting the jth recent wait time of calls arriving with n calls already in the queue;
      calculate an statistical value, $W_n$, for each n among all such $W_{nj}$.

16. The method as recited in claim 15 wherein said statistical value, $W_n$, is the average value.

17. The method as recited in claim 15 wherein said statistical value, $W_n$, is the mode value.

18. The method as recited in claim 15 wherein said statistical value, $W_n$, is the median value.

19. A method for determining a wait time estimation in a call center based on queue-dequeue calls, the method comprising:
   determining a plurality of most recent wait time values of calls arriving with a predetermined numbers of calls already in queue; and
   determining a statistical value for each of said predetermined number of calls among said plurality of wait time values.

20. A method in a call center for implementing a waiting period for callers who may not be immediately serviced by available agents, the method comprising:
   associating an initial set of agents to which said caller may be queued;
   delivering a first wait time announcement to said caller regarding an estimated wait time for service;
   monitoring changes in said callers conditions during said wait period;
   if said conditions meet pre-determined changes, modifying said set of agents to which said caller may be queued;
   if modifying is done, delivering an additional wait time announcement regarding the estimated wait time for service, wherein the delivering a first wait time announcement comprises estimating wait time based upon a mean inter-arrival time method.

21. A method in a call center for implementing a waiting period for callers who may not be immediately serviced by available agents, the method comprising:
   associating an initial set of agents to which said caller may be queued;
   delivering a first wait time announcement to said caller regarding an estimated wait time for service;
   monitoring changes in said caller's conditions during said wait period;
   if said conditions meet predetermined changes, modifying said set of agents to which said caller may be queued;
   if modifying is done, delivering an additional wait time announcement regarding the estimated wait time for service;
   wherein the delivering a first wait time announcement comprises estimating wait time based on queue-dequeue calls, by determining a plurality of most recent wait time values of calls arriving with a predetermined numbers of calls already in queue; and determining a statistical value for each of said predetermined number of calls among said plurality of wait time values.

* * * * *